US008949994B2

(12) United States Patent
Amit et al.

(10) Patent No.: US 8,949,994 B2
(45) Date of Patent: *Feb. 3, 2015

(54) DETECTING PERSISTENT VULNERABILITIES IN WEB APPLICATIONS

(75) Inventors: Yair Amit, Tel Aviv (IL); Omer Tripp, Har-Adar (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/421,125

(22) Filed: Mar. 15, 2012

(65) Prior Publication Data

US 2012/0311713 A1 Dec. 6, 2012

Related U.S. Application Data

(63) Continuation of application No. 13/149,158, filed on May 31, 2011.

(51) Int. Cl.
| | | |
|---|---|---|
| *G06F 21/00* | (2013.01) | |
| *G06F 21/56* | (2013.01) | |
| *H04L 29/06* | (2006.01) | |
| *G06F 21/51* | (2013.01) | |
| *G06F 21/57* | (2013.01) | |

(52) U.S. Cl.
CPC .......... *G06F 21/563* (2013.01); *H04L 63/1433* (2013.01); *H04L 63/1466* (2013.01); *G06F 21/51* (2013.01); *G06F 21/566* (2013.01); *G06F 21/577* (2013.01)
USPC ............................. 726/25; 726/22; 713/187

(58) Field of Classification Search
CPC .. G06F 21/51; H04L 63/1433; H04L 63/1466
USPC ........................................ 726/22, 25; 713/187
See application file for complete search history.

(56) References Cited

U.S. PATENT DOCUMENTS

| | | | |
|---|---|---|---|
| 7,343,626 B1* | 3/2008 | Gallagher | 726/25 |
| 7,509,675 B2* | 3/2009 | Aaron | 726/22 |
| 7,594,142 B1* | 9/2009 | O'Leary et al. | 714/38.11 |
| 7,975,296 B2* | 7/2011 | Apfelbaum et al. | 726/22 |
| 8,112,799 B1 | 2/2012 | Loiodice et al. | |

(Continued)

OTHER PUBLICATIONS

Di Lucca, G.A.; Fasolino, A. R.; Mastroianni, M.; Tramontana, P.; "Identifying Cross Site Scripting Vulnerabilities in Web Applications", 26th Annual International Telecommunications Energy Conference, Sep. 11, 2004, pp. 71-80.*

(Continued)

*Primary Examiner* — Victor Lesniewski
(74) *Attorney, Agent, or Firm* — Schmeiser, Olsen & Watts LLP

(57) ABSTRACT

A method, including storing a test payload to a persistent state of an application and performing a static analysis to identify a first code location in the application that retrieves the test payload, to identify a first path from an entry point to the first code location, and to identify a second path from the first code location to a second code location that executes a security sensitive operation using the retrieved data. A dynamic analysis is then performed to retrieve the test payload via the first path, and to convey the test payload to the second code location via the second path.

6 Claims, 2 Drawing Sheets

(56) References Cited

U.S. PATENT DOCUMENTS

| | | | |
|---|---|---|---|
| 8,239,952 B1* | 8/2012 | Oliphant et al. | 726/25 |
| 8,347,392 B2* | 1/2013 | Chess et al. | 726/25 |
| 8,365,290 B2* | 1/2013 | Young | 726/25 |
| 8,448,241 B1* | 5/2013 | Kadakia | 726/22 |
| 8,458,798 B2* | 6/2013 | Williams et al. | 726/25 |
| 8,533,328 B2* | 9/2013 | Jeon | 709/225 |
| 8,601,586 B1* | 12/2013 | Boutros et al. | 726/25 |
| 8,656,495 B2* | 2/2014 | Sima et al. | 726/25 |
| 2004/0260754 A1* | 12/2004 | Olson et al. | 709/200 |
| 2006/0090206 A1 | 4/2006 | Ladner et al. | |
| 2008/0083012 A1* | 4/2008 | Yu et al. | 726/1 |
| 2008/0120722 A1 | 5/2008 | Sima et al. | |
| 2008/0148408 A1* | 6/2008 | Kao et al. | 726/25 |
| 2008/0263650 A1 | 10/2008 | Kerschbaum | |
| 2009/0100518 A1* | 4/2009 | Overcash | 726/22 |
| 2009/0119777 A1 | 5/2009 | Jeon | |
| 2009/0165124 A1* | 6/2009 | Spektor | 726/21 |
| 2009/0193497 A1 | 7/2009 | Kikushi et al. | |
| 2010/0083240 A1* | 4/2010 | Siman | 717/144 |
| 2010/0257603 A1 | 10/2010 | Chander et al. | |
| 2010/0293616 A1 | 11/2010 | Young | |
| 2011/0088095 A1* | 4/2011 | Stewart et al. | 726/25 |
| 2011/0154473 A1* | 6/2011 | Anderson et al. | 726/11 |
| 2011/0173693 A1* | 7/2011 | Wysopal et al. | 726/19 |
| 2011/0231936 A1 | 9/2011 | Williams et al. | |
| 2012/0167209 A1* | 6/2012 | Molnar et al. | 726/22 |
| 2012/0260344 A1 | 10/2012 | Maor et al. | |
| 2013/0198848 A1* | 8/2013 | Wolff | 726/25 |

OTHER PUBLICATIONS

Wassermann, Gary; Su, Zhendong; "Static Detection of Cross-Site Scripting Vulnerabilities", 30th International Conference on Software Engineering, May 10-18, 2008, pp. 171-180.*

Non-Final Office Action in related U.S. Appl. No. 13/149,158, mailed Jan. 2, 2013; 11 pages.

Balzarotti, Davide, et al., "Saner: Composing Static and Dynamic Analysis to Validate Sanitation in Web Applications", Proceedings of the 2008 IEEE Symposium on Security and Privacy, ACM; 15 pages.

Tramontana, P., et al., "Identifying Cross Site Scripting Vulnerabilities in Web Applications", Web Site Evolution, 2004, WSE 2004 Proceedings, Sixth IEEE International Workshop; 25 pages.

Huang, Yao-Wen, et al., "Securing Web Application Code by Static Analysis and Runtime Protection", 2005, '04 Proceedings of the 13th International Conference on World Wide Web, ACM; 12 pages.

Kiezun, Adam, et al., "Automatic Creation of SQL Injection and Cross-Site Scripting Attacks", Sep. 10, 2008, Proceedings of the 31st International Conference on Software Engineering, ACM; 6 pages.

Final Office Action in related U.S. Appl. No. 13/149,158, mailed on Apr. 29, 2013; 13 pages.

Non-Final Office Action in related U.S. Appl. No. 13/149,158, mailed on Aug. 22, 2013; 11 pages.

Final Office Action in related U.S. Appl. No. 13/149,158, mailed on Dec. 27, 2013; 12 pages.

Non-Final Office Action in related U.S. Appl. No. 13/149,158, mailed on Apr. 9, 2014; 15 pages.

* cited by examiner

DETECTING PERSISTENT VULNERABILITIES IN WEB APPLICATIONS

RELATED APPLICATIONS

This application is a continuation application claiming the benefit of the filing date of U.S. patent application Ser. No. 13/149,158, filed May 31, 2011, entitled "Detecting Persistent Vulnerabilities in Web Applications," contents of which are incorporated by reference herein in their entirety.

FIELD OF THE INVENTION

This invention relates generally to computer software analysis and testing, and specifically to combining static and dynamic analysis techniques to detect persistent vulnerabilities in web applications.

BACKGROUND

Traditional analysis of software systems includes both static analysis and dynamic analysis. Static analysis (also call white box testing) analyzes software system code for dependencies without relying on any external resources or dynamic events. Dynamic analysis (also called black box testing) on the other hand, executes the code and monitors its concrete execution. Another facet of dynamic analysis is testing how the system behaves when interacting with external files such as databases.

For example, Structured Query Language (SQL) queries in modern programming languages such as Visual Basic, Java, C++ and C# can be computed dynamically at run-time as strings, which are then sent to the database for execution. These strings contain the names of databases, tables, and fields, and can come from external sources such as user input, configuration files, or databases. Therefore, it is difficult to discover these names solely by static analysis, since the data dependencies between the program and the database component may not be discovered.

Some dependencies may occur in every execution of the application, while others may only happen on certain executions, depending on user input, external data and the non-deterministic nature of the running system. For example, dynamic loading in Java may lead to references between classes that are dynamically determined (and thus cannot be statically detected). Another example is the composition of Structured Query Language (SQL) queries as strings that may depend on external data.

SUMMARY

There is provided, in accordance with an embodiment of the present invention a method, including storing a test payload to a persistent state of an application, performing a static analysis to identify a first code location in the application that retrieves the test payload, to identify a first path from an entry point to the first code location, and to identify a second path from the first code location to a second code location that executes a security sensitive operation using the retrieved data, and performing a dynamic analysis to retrieve the test payload via the first path, and to convey the test payload to the second code location via the second path.

BRIEF DESCRIPTION OF THE DRAWINGS

The disclosure is herein described, by way of example only, with reference to the accompanying drawings, wherein.

DETAILED DESCRIPTION

Overview

Cross-Site Scripting (XSS) is a security vulnerability typically found in web applications. During a persistent XSS attack, a malicious payload (e.g., a malware application configured to perform a persistent XSS attack) is stored to a persistent state of the web application. The persistent state comprises the state that persists across input/output (I/O) requests processed by the web application. For example, if a malicious payload is stored to a database, the payload typically remains dormant until it is retrieved by the web application. The malicious payload can be written in Javascript or any other client-side language.

Conceptually, a persistent XSS attack comprises two steps. In the first step, the malicious payload is stored to the persistent state of the Web application (e.g., its database or supporting file system). In the second stage, the payload is retrieved (sometimes following a series of benign user input/output requests). A typical environment where a persistent XSS attack can be launched is an online message board, where users are allowed to post HTML-formatted messages for other users to read.

Embodiments of the present invention provide methods and systems for detecting persistent vulnerabilities in web applications. By combining static and dynamic analysis techniques into a hybrid analysis, embodiments of the present inventions can exploit the strengths and overcome the limitations of each of the respective analysis techniques.

In some embodiments, an initial dynamic analysis is performed by conveying a test payload (e.g., a malware application configured to perform a persistent XSS attack) to the persistent state of a web application. After conveying the payload, a static analysis is performed to identify paths and code locations in the web application that are used to retrieve the payload, and to convey the payload to a security sensitive operation. Finally, using the identified paths and code locations, a subsequent dynamic analysis is performed to trigger execution of the web application's code along one of the paths, and thereby verify the attack.

System Description

Figure 1:
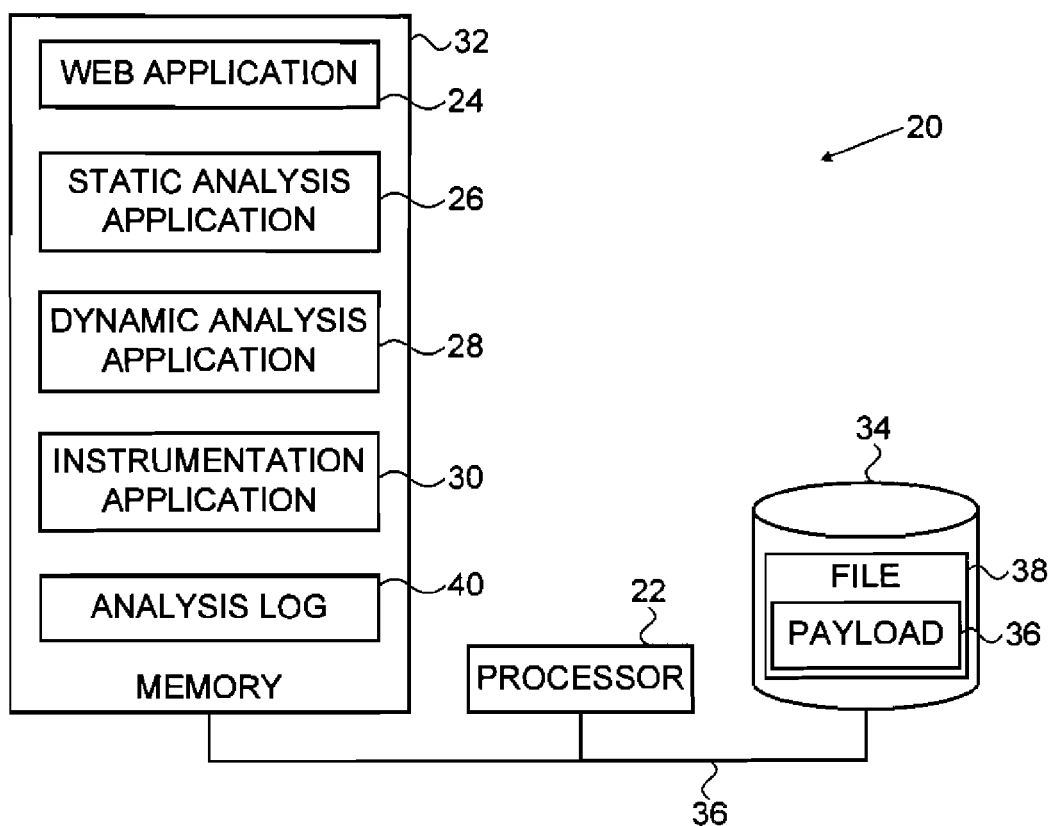
FIG. 1 is a schematic pictorial illustration of a system configured to detecting persistent vulnerabilities in web applications by combining static and dynamic analysis, in accordance with an embodiment of the present invention.

FIG. 1 is a schematic pictorial illustration of a system 20 configured to detect persistent vulnerabilities in web applications by combining static and dynamic analysis techniques, in accordance with an embodiment of the present invention. System 20 comprises a processor 22 configured to execute a web application 24, a static analysis application 26, a dynamic analysis application 28 and an instrumentation application 30 from a memory 32. The operation of static analysis application 26, dynamic analysis application 28 and instrumentation application 30 are discussed in further detail hereinbelow. Processor 22 and memory 32 are coupled to a storage device 34 (such as a disk drive), acting as a non-volatile memory, via a bus 36.

In operation, web application 24 accesses a file 38. As described in further detail hereinbelow, dynamic analysis application 26 initially stores a test payload 36 (e.g., a malware application) to file 38 (e.g., a database). After test payload 36 is stored to file 38, static analysis application 26 detects any vulnerability that web application 24 may have to a persistent XSS attack. While analyzing web application 24, static analysis application 26 and dynamic analysis application 28 may store results of their respective analyses to an analysis log 40.

Processor 22 typically comprises a general-purpose computer configured to carry out the functions described herein. Software operated by the processor may be downloaded to the memories in electronic form, over a network, for example, or it may be provided on non-transitory tangible media, such as optical, magnetic or electronic memory media. Alternatively, some or all of the functions of the processor may be carried out by dedicated or programmable digital hardware components, or by using a combination of hardware and software elements.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Detecting Persistent Vulnerabilities

Figure 2:
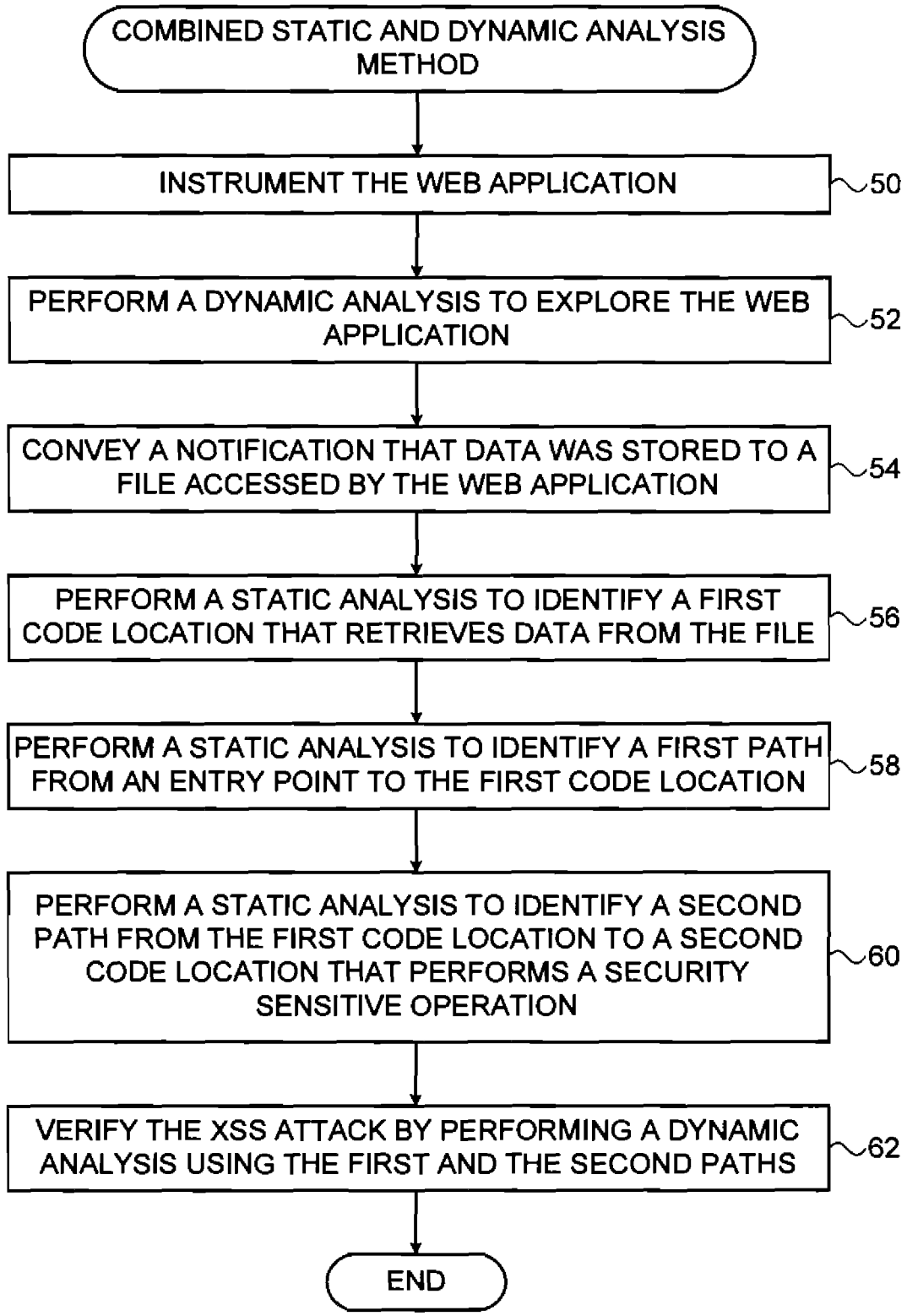
FIG. 2 is a flow diagram that schematically illustrates a method of a combined static and dynamic code analysis, in accordance with an embodiment of the present invention.

FIG. 2 is a flow diagram that schematically illustrates a method of combining static and dynamic analysis techniques to detect persistent vulnerabilities in an application such as web application 24, in accordance with an embodiment of the present invention. In an initialization step 50, processor 22 instruments web application 24 by executing instrumentation application 30. In embodiments of the present invention, instrumentation application 30 is configured to monitor the persistent state of web application 24 (also referred to herein as the persistent state). In operation, instrumentation application 30 may convey a notification to processor 22 whenever data is transmitted to the persistent state (i.e., stored to file 38). The notification may include information such as the location in file 38 that the data was stored to.

In an exploration step 52, processor 22 executes dynamic analysis application 28 to initiate a dynamic analysis to explore web application 24 with the goal of successfully conveying test payload 36 (e.g., a malware application) to the persistent state of web application 24. The dynamic analysis starts at any entry point, such as a Uniform Resource Locator (URL) of web application 24, and "crawls through" the web application. In a notification step 54, upon detecting the conveyed data (i.e., payload 36), instrumentation application 30 conveys a notification to processor 22 that data was transmitted to the persistent state of web application 24 (i.e., payload 36 was successfully stored to file 38, which is accessed by the web application).

Upon receiving the notification, processor 22 executes static analysis application 26 to perform a series of static analyses to identify how a persistent XSS attack (i.e., payload 36) can attack web application 24. In a first static analysis step 56, static analysis application 26 identifies a first code location in web application 24 that interacts with the persistent state (i.e., retrieves data from file 38). For example, if the notification indicates that data has been stored to file 38, then the static analysis can search for code in web application 24 that accesses the file, such as a "file open" statement followed by a "file read" statement.

The following table lists sample code containing a vulnerability that can be detected using embodiments of the present invention. For example, if malicious data was written to /tmp/userData.txt, then static analysis application can identify that a flow reaching the sample block of code with the admin parameter set to True can expose the vulnerability (i.e., where it is assumed that renderUserData( . . . ) makes calls to security sinks that render the file content to the response HTML).

| Sample Code |
|---|
| if (request.getParameter("admin").equals("true"))<br>{<br>    File f = new File("/tmp/userData.txt");<br>    FileReader fr = new FileReader(f);<br>    BufferedReader br = new BufferedReader(fr);<br>    String content = br.readLine( );<br>    renderUserData(content);<br>} |

After identifying the first code location, in a second static analysis step 58, static analysis application 26 identifies a first path in web application 24 from an entry point (of the web application) to the first code location. The second static analysis step can be accomplished via weakest-preconditions analysis, as can be performed by static analysis applications such Snugglebug™ from International Business Machines (IBM) Corporation (Armonk, N.Y.). During the second static analysis, static analysis application 26 may first traverse the web application's (interprocedural) control-flow graph backwards from the point of interest (e.g., the file-open statement described supra) and then compute sufficient conditions on the input to reach the first code location. Typically, a sufficient condition comprises constraints on the input, which if satisfied, guarantee that control flow will reach the first code location. For example, in the sample code presented supra, the sufficient condition comprises when admin is set to True.

In a third static analysis step 60, static analysis application 26 identifies a second path (i.e., a continuation of the first path) from the first code location to a second code location (i.e., in web application 24) that performs a security-sensitive operation using the retrieved data. Therefore the combined first and second paths in web application 24 typically start from a web entry point (e.g., the doGet method of a Java servlet) and end with a security-sensitive operation.

An example of a security sensitive operation is a resp.getWriter( ).write( . . . ) Java statement that renders payload 36 to HyperText Markup Language (HTML) on a display (not shown).

Finally, in a dynamic analysis step 62, dynamic analysis application 28 verifies the persistent XSS attack using the first and the second paths (and by inference, the entry point, and the first and the second code locations) identified by the static analysis steps described supra. In some embodiments, static analysis application 26 may store the paths to log file 40. Upon retrieving the paths, dynamic analysis application 28 performs a dynamic analysis by retrieving payload 36 from the persistent state (i.e., file 38) via the first path, and then conveying the payload to the second code location (i.e., the security sensitive operation) via the second path, thereby performing and verifying the persistent XSS attack.

Configuring dynamic analysis application 28 to use parameters (i.e., the first and the second paths) provided by static analysis application 26 is described in U.S. patent application Ser. No. 12/913,314, filed on Oct. 27, 2010, which is incorporated herein by reference. Documents incorporated by reference in the present patent application are to be considered an integral part of the application except that to the extent any terms are defined in these incorporated documents in a manner that conflicts with the definitions made explicitly or implicitly in the present specification, only the definitions in the present specification should be considered.

While the method described in the flow diagram identifies a single "relevant" path from the entry point to the security sensitive operation, the dynamic and static analysis steps described supra may find multiple first paths between multiple entry points and multiple first code locations, and multiple second paths between the multiple first code locations and multiple second code locations. Therefore, combinations of the multiple first paths and the multiple second paths comprise relevant paths that can be used for an XSS attack.

On the other hand, there may be instances where web application 24 reads test payload 36 from the web application's persistent state, but the payload is then sanitized or used only for security-insensitive operations. In other words, static analysis application can identify a first path (between an entry point and a first code location that interacts with the persistent state of web application 24), but cannot identify a second path (between the first code location and a security sensitive operation). In these instances, dynamic analysis step 62 typically ignores the identified first path, given that an XSS attack along the identified first path will probably fail, since the web application does not forward the test payload to a security sensitive operation (i.e., the combined first and second paths is not "relevant").

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. A method, comprising:
   executing an instrumentation application configured to monitor a persistent state of an application at a memory of a computer;
   performing, by a dynamic analysis application at the memory of the computer, a first dynamic analysis to explore an application at the memory to provide for a conveyance of a test payload to the persistent state of the application, including a file that is accessed by the application, wherein the test payload comprises a malware application configured to perform a persistent cross-site scripting (XSS) attack;
   transferring the test payload to the persistent state of the application;
   storing, at a storage device, the test payload, wherein the test payload remains dormant until the test payload is retrieved by the application from the storage device;
   processing a notification including information that the test payload is transferred to a location at the storage device;
   performing, by a static analysis application at the memory in response to receiving the notification that the test payload is transferred to the persistent state, a static analysis to identify a first code location in the application that interacts with the persistent state of the application at the storage device, to identify a first path from an entry point of the application to the first code location in the application, and to identify a second path from the first code location to a second code location in the application that executes a security sensitive operation using the retrieved data; the static analysis performed to identify how the persistent XSS attack related to the test payload can attack the application at the memory; and
   performing, by the dynamic analysis application at the memory, a second dynamic analysis to retrieve the test payload from the persistent state via the first path, and to convey the test payload to the second code location via the second path, the second dynamic analysis performed to verify the persistent XSS attack using the first and second paths identified in the static analysis.

2. The method according to claim 1, wherein the test payload is conveyed to the persistent state of the application in response to performing the first dynamic analysis.

3. The method according to claim 2, and comprising, prior to performing the first dynamic analysis, executing the instrumentation application configured to monitor the persistent state of the application.

4. The method according to claim 3, wherein the static analysis is initiated upon the instrumentation application detecting the stored test payload.

5. The method according to claim 1, wherein the entry point comprises a Uniform Resource Locator (URL) of the application.

6. The method according to claim 1, wherein the second dynamic analysis verifies the persistent XSS attack.

* * * * *